(12) United States Patent
de la Barre et al.

(10) Patent No.: US 8,687,051 B2
(45) Date of Patent: Apr. 1, 2014

(54) SCREEN AND METHOD FOR REPRESENTING PICTURE INFORMATION

(75) Inventors: Rene de la Barre, Mittweida (DE); Silvio Jurk, Crosta (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 322 days.

(21) Appl. No.: 13/037,892

(22) Filed: Mar. 1, 2011

(65) Prior Publication Data

US 2011/0216171 A1  Sep. 8, 2011

Related U.S. Application Data

(60) Provisional application No. 61/310,074, filed on Mar. 3, 2010.

(51) Int. Cl.
*H04N 13/04* (2006.01)

(52) U.S. Cl.
USPC .......... 348/51; 348/42; 348/54; 348/169; 348/E13.075; 348/E13.023; 382/103

(58) Field of Classification Search
None
See application file for complete search history.

(56) References Cited

U.S. PATENT DOCUMENTS

| | | | |
|---|---|---|---|
| 5,822,117 A * | 10/1998 | Kleinberger et al. | 359/465 |
| 6,195,069 B1 * | 2/2001 | Rhoads | 345/6 |
| 6,307,585 B1 * | 10/2001 | Hentschke | 348/51 |
| 6,603,504 B1 * | 8/2003 | Son et al. | 348/54 |
| 6,791,570 B1 * | 9/2004 | Schwerdtner et al. | 345/613 |
| 7,697,750 B2 * | 4/2010 | Simmons | 382/154 |
| 2006/0132916 A1 * | 6/2006 | Oikawa et al. | 359/463 |
| 2006/0170764 A1 * | 8/2006 | Hentschke | 348/42 |
| 2006/0215018 A1 | 9/2006 | Fukushima et al. | |
| 2006/0279567 A1 * | 12/2006 | Schwerdtner et al. | 345/419 |
| 2008/0007559 A1 * | 1/2008 | Kalaiah et al. | 345/501 |
| 2008/0024598 A1 * | 1/2008 | Perlin et al. | 348/55 |
| 2008/0055547 A1 | 3/2008 | Saishu et al. | |

(Continued)

FOREIGN PATENT DOCUMENTS

| | | |
|---|---|---|
| DE | 10043305 A1 | 3/2002 |
| DE | 102006031799 B3 | 1/2008 |
| EP | 0877966 B1 | 11/1998 |
| EP | 1689162 A2 | 8/2006 |
| WO | WO2009095862 A1 | 8/2009 |

OTHER PUBLICATIONS

International Search Report issued in PCT/EP2010/007441, mailed Mar. 16, 2011, 3 pages.

*Primary Examiner* — Christopher S Kelley
*Assistant Examiner* — Kaitlin A Retallick
(74) *Attorney, Agent, or Firm* — Faegre Baker Daniels LLP (57) ABSTRACT

A method for representing picture information on an autostereoscopic screen that is designed as a multiperson screen and that is suitable for the simultaneous display of a plurality of views which are visible in each case from at least one of different observation zones. The screen includes a matrix screen having a plurality of pixels as well as a beam splitter raster that is suitable for guiding light coming from the pixels, in each case into at least one of the observation zones. In the method, the pixels are activated with picture information of at least two different scenes, in a manner such that a first observer of the screen may exclusively see a first of the at least two scenes and a second observer of the screen may exclusively see a second of the at least two scenes.

15 Claims, 7 Drawing Sheets

(56) References Cited

U.S. PATENT DOCUMENTS

| | | | |
|---|---|---|---|
| 2008/0117231 A1* | 5/2008 | Kimpe | 345/629 |
| 2008/0117233 A1* | 5/2008 | Mather et al. | 345/690 |
| 2009/0123030 A1 | 5/2009 | De La Barre et al. | |
| 2009/0278936 A1* | 11/2009 | Pastoor et al. | 348/169 |
| 2010/0295928 A1 | 11/2010 | De La Barre et al. | |
| 2011/0128356 A1 | 6/2011 | de la Barre et al. | |
| 2011/0216061 A1 | 9/2011 | De La Barre et al. | |
| 2011/0216171 A1 | 9/2011 | De La Barre et al. | |
| 2011/0310092 A1* | 12/2011 | de la Barre | 345/419 |

* cited by examiner

SCREEN AND METHOD FOR REPRESENTING PICTURE INFORMATION

RELATED APPLICATION

This application claims the benefit under 35 U.S.C. §119 of U.S. Provisional Application Ser. No. 61/310,074 filed Mar. 3, 2010 entitled "A SCREEN AND METHOD FOR REPRESENTING PICTURE INFORMATION," which application is incorporated by reference herein in its entirety.

TECHNICAL FIELD

The invention relates to a method for representing picture information on an auto-stereoscopic screen.

BACKGROUND

Picture information may be represented on an auto-stereoscopic screen that is designed as a multi-person screen and that is suitable for the simultaneous display of a plurality of more than two views visible in each case from different observation zones laterally displaced to one another. An autostereoscopic screen may include a matrix screen having a multitude of pixels and a beam splitter raster, wherein the beam splitter raster is suitable for guiding light coming from the pixels, into one of the observation zones. Several stereoscopic fields complementary to one another may be represented on a screen, such that one or more observers may autostereoscopically perceive a stereo-picture composed in each case of two of the fields, when they are present in each case with one eye in two different observation zones lying next to one another. The fields which are visible from observation zones which are adjacent in each case, are thereby selected complementarily to one another, such that several observers who are present next to one another, may also perceive a represented scene—in each case from slightly different perspectives—as a stereo-picture.

Screens of this type are known for carrying out such methods, and are suitable for simultaneously displaying a plurality of more than two views visible in each case from at least one of several laterally offset observation zones, and include a matrix screen with a multitude of pixels, a beam splitter raster which is suitable for guiding light coming from the pixels, in each case into at least one of the observation zones, and a control unit for activating the pixels of the matrix screen in dependence on picture information. Such screens are also indicated as multi-view displays, multi-user displays or multi-person screens.

SUMMARY

The invention permits several users of a screen to be able to obtain picture contents which are specific to each of the users—thus for example different television programs, without compromising the other user. In an embodiment, the screen pixels may be activated with picture information of at least two different scenes, in a manner such that a first observer may see a first of the at least two scenes, and a second observer may simultaneously see a second of the at least two scenes.

Thus at least two different observers of a screen may independently be shown selectable contents, which are specific to each of these observers, by way of the fact that the pixels of one screen are activated with picture information of at least two difference scenes, in a manner such that the first observer of the screen may exclusively see a first of the at least two scenes, and a second observer of the screen who is laterally displaced with respect to the first user may simultaneously exclusively see a second of the at least two scenes. Thereby of course, one may also reproduce more than two scenes in this manner, such that more than two observers may in each case see exactly one of these scenes from three positions laterally displaced to one another. Thereby, it is exclusively those—possibly moved—pictures which do not complement one another as stereoscopic fields complementary to one another, into a stereo-picture, which are indicated as different scenes. In some embodiments, this may be carried out using a conventional autostereoscopic screen for its implementation, for which screen therefore a new use is suggested with the present invention and the circle of useful applications is expanded.

In some embodiments, the matrix screen of the applied screen may for example be a liquid crystal screen (thus an LCD display) or a OLED display, wherein the pixels do not necessarily need to be arranged in rows and columns, but under certain circumstances may also form a different pattern. With regard to the pixels, there may be sub-pixels of three different colors, wherein picture points of each of the scenes are then reproduced in each case by groups of in each case at least three subpixels. Typically, the subpixels in this case are arranged in each of a multitude of lines of the matrix screen, in each case with colors alternating in a cyclical sequence.

The beam splitter raster which may also be called a barrier raster, may e.g. be given by a slot raster or a step raster or a hole raster or a cylinder lens raster or a ball lens raster.

In some embodiments, the method may be realized by way of picture points of each of the scenes being reproduced by groups of a suitable size, of adjacent pixels of the matrix screen, wherein groups that are assigned to the different scenes, alternate in a cyclical sequence, in each of a multitude of lines of the matrix screen. The groups of adjacent pixels, which are assigned to the different scenes, may thereby connect directly to one another or be separated from one another by way of one or more blanked pixels and be arranged at distances which may be selected according to the geometric conditions.

Thus one may succeed in each of the at least two different scenes in each case being visible from at least one coherent zone in front of the screen, from which zone the other scenes are not visible.

A multiperson screen is suitable for simultaneously displaying a plurality of more than two views that are visible in each case from at least one of the respective coherent observation zones. The zones from which the different scenes are visible, may be designed in a particularly flexible manner and in particular in a manner which is adequately large for a comfortable observation. In some embodiments, a number of different scenes is represented in the screen, which is smaller compared to the mentioned plurality, even if under certain circumstances, it is the case of more than two scenes, for example of three or four different scenes for just as many observers. Then at least one of the mentioned coherent zones, from which in each case of the scenes is visible, may be larger than the individual observation zones. In some embodiments, all of these zones are larger than the individual observation zones, which may be realized in a simple manner when the screen is designed for representing an adequately large number of different views.

In some embodiments, the picture information of at least one of the scenes being written into the pixels of the matrix screen, in a manner which is spread in the lateral direction, such that the coherent zones from which this scene is visible, has a maximal width in an observation zone, which lies closer to the screen than a plane in which the observation zones have a maximal width. By way of this, an observer of this scene may also be placed in front of the observation plane for which the screen is actually designed, which may permit a more comfortable observation, as well as permitting different observers a larger freedom with respect to the selection of their places.

The method may be used independently of whether the picture information of the different scenes is present in each case for only a mono-picture or for stereoscopic fields that complement one another into a stereo-picture. One may also envisage the picture information of at least one of the scenes including picture information of two different stereoscopic fields which complement one another into a stereo-picture, wherein the matrix screen is then activated such that each of these fields is visible in one of the two mentioned coherent zones, so that one of the observers may perceive this stereo-picture in an autostereoscopic manner.

In some embodiments, a head position or eye position of at least one of the observers—preferably of each observer—may be detected, and activation of the screen may be set or changed in dependence on the detected head position or eye position, in a manner such that two eyes of the observer come to lie or remain within at least one zone, from which the scene assigned to this observer is visible. A freedom of movement of the different observers is advantageously increased by way of this. Thereby, pixel groups or edges of pixel groups which in each case reproduce one of the picture points of the scene assigned to the respective observer, may be displaced for tracking the zones, by way of adding previously blanked pixels or ones assigned or other picture points—e.g. those pixels which until now have been assigned to another scene or another field—to these pixel groups and/or by way darkly scanning outer lying pixels of these pixel groups or assigning them to other picture points. Under certain circumstances, the tracking thereby may also be effected in a finely graded manner or in a quasi stepless manner, by way of a redistribution of intensities with which pixels at the edge of the pixel groups are activated. Thereby, with a change of a distance between observer and screen, the lateral spread of the picture points assigned to this observer—given in each case by one of the pixel groups—may be changed, while these picture points or pixel groups are laterally displaced given a lateral movement. Thereby, one may ensure that the picture points of the different scenes have space next to one another on the matrix screen, alone by way of each observer assuming a position, from which no other observer blocks his view onto the screen.

In some embodiments, a screen is envisaged for simultaneously displaying a plurality of more than two views in each case visible from at least one of several laterally displaced observation zones, and a matrix screen with a multitude of pixels, a beam splitter raster which is suitable for guiding the light emitted from the pixels into in each case at least one of the observation zones, and a control unit for activating the pixels of the matrix screen in dependence on picture information, are particularly suitable for carrying out a method of the described type, wherein the control unit with regard to programming technology, is set up to distribute the picture information of a number of pictures of at least two different scenes, said number being smaller compared to the mentioned plurality, onto the pixels, in a manner such that a coherent zone in front of the screen is assigned to each of these pictures, from which zone this scene is exclusively visible and of which at least one is larger than the individual observation zones.

In some embodiments, the control unit is configured to activate the pixels of the matrix screen in a manner such that the picture points of each of the pictures is reproduced in each case by way of groups of adjacent pixels of the matrix screen, wherein in each case groups which are assigned to the different pictures, alternate in a cyclical sequence in each of a multitude of lines of the matrix screen.

Moreover, the control unit may be set up to write the picture information of at least one of the pictures, into the pixel of the matrix screen, in a manner spread in a lateral direction, such that the coherent zone, from which this picture is visible, has a maximal width in an observation plane, which lies closer to the screen, than a plane in which the observations zones have a maximal width.

Two or more stereoscopic pictures may also be amongst the mentioned pictures, the stereoscopic pictures complementing one another into a stereo-picture of one of the scenes. The control unit may be configured to activate the matrix screen such that these fields are visible in two zones which are adjacent to one another.

Additionally, the screen may have a device for detecting a head position or eye position of at least one observer, wherein the control unit in this case is also set up to activate the matrix screen in dependence on the detected head position or pixel position, in a manner such that two eyes of this observer come to lie or remain within the at least one zone, from which one of the scenes is visible.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE FIGURES

Embodiment examples of the invention are hereinafter explained by way of the FIGS. 1 to 7.

DETAILED DESCRIPTION

Figure 1:
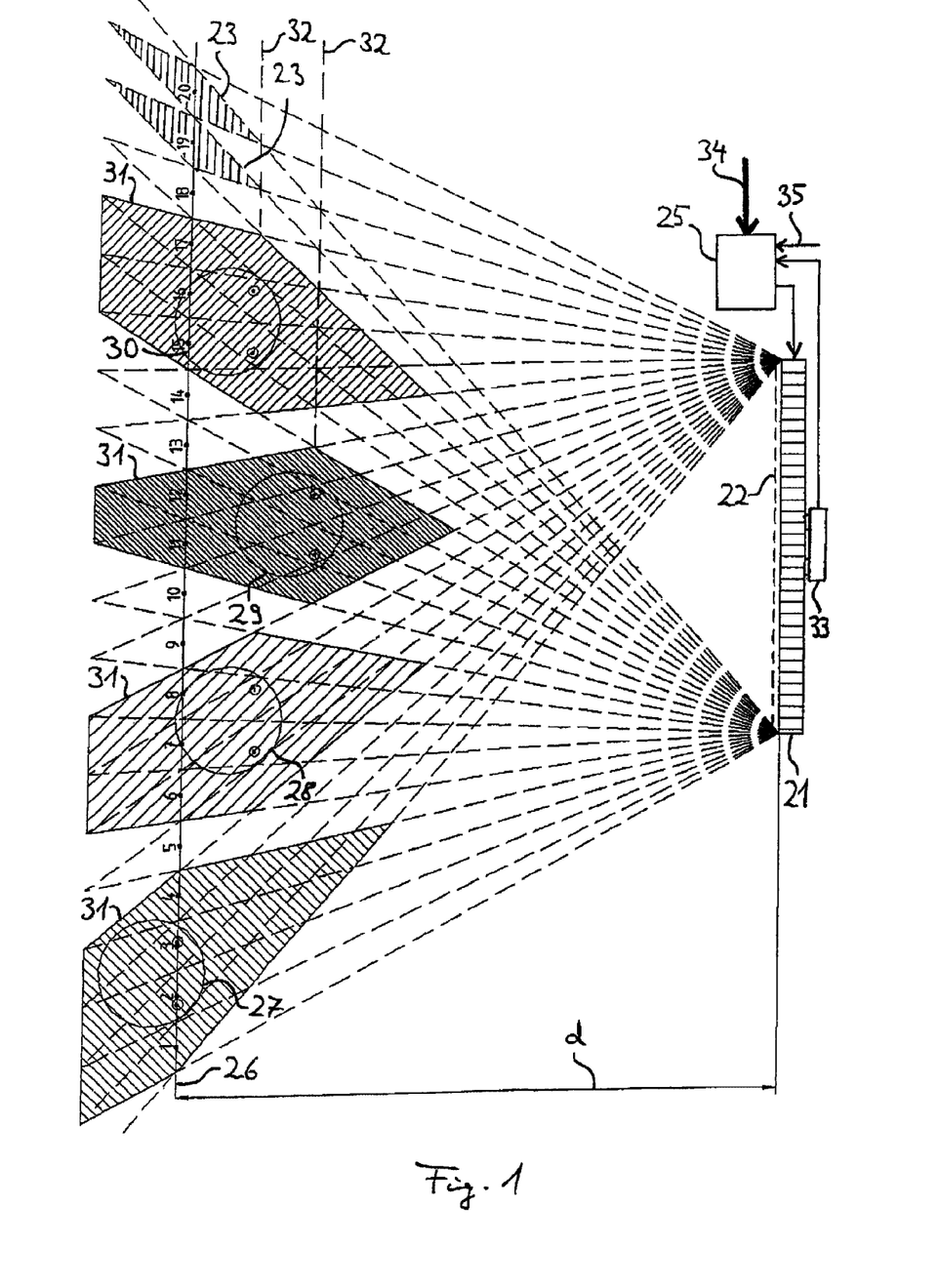
FIG. 1 is a schematic representation of a view of a screen having a matrix screen and a beam splitter raster, and on which picture information for four different observers is represented.

FIG. 1 represents a screen that is an autostereoscopic screen and that includes a matrix screen 21 with a multitude of subpixels, and a beam splitter raster 22 which is arranged in front of the matrix screen 21 and which is suitable for guiding the light coming from the subpixels of the matrix screen 21 in each case into different ones of a multitude of laterally displaced observation zones 23. These observation zones 23 here numbered through and correspond to twenty picture channels 1 to 20 of the screen. The beam splitter raster 22 may also be called a barrier raster.

Figure 3:
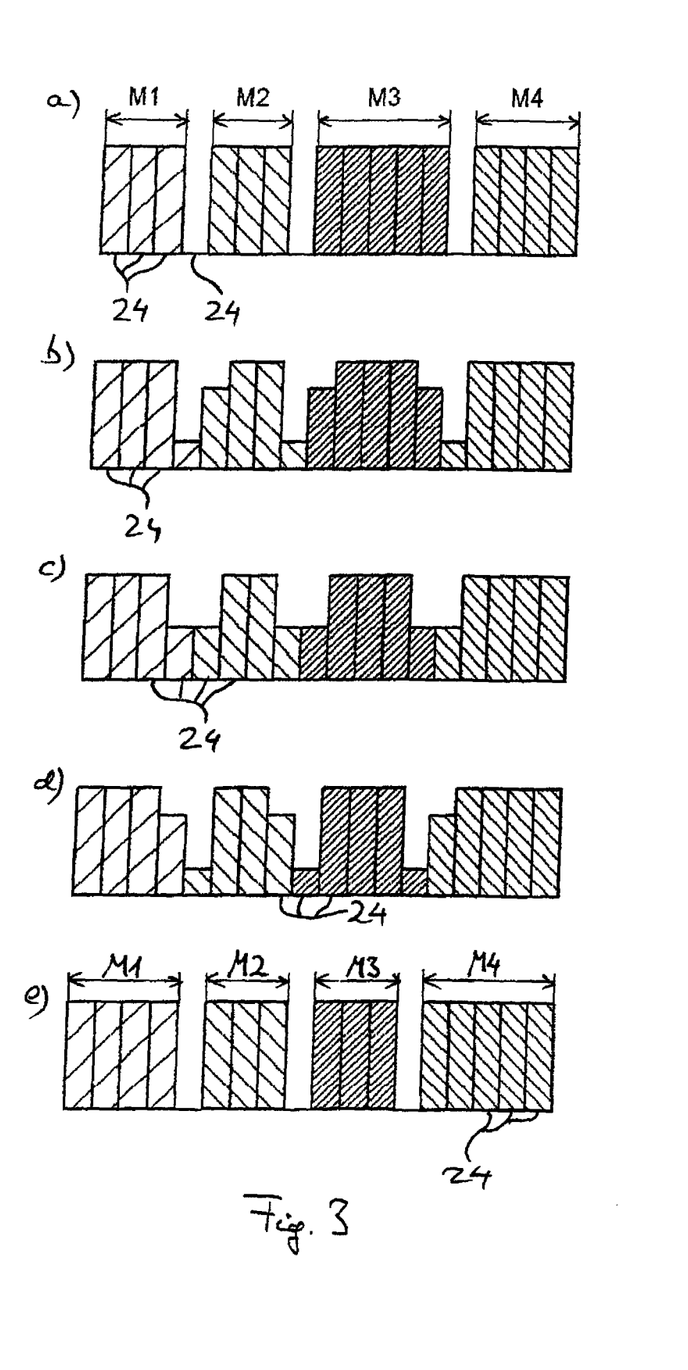
FIG. 3 is a schematic representation illustration how adjacent subpixels in a line of the matrix screen are activated and how the activation of the subpixels is changed with a movement of the observer.

The matrix screen 21 may be a liquid crystal screen which, in a multitude of lines, in each case includes a multitude of subpixels, wherein red, green and blue subpixels alternate in a cyclic sequence in each line. Instead of this, one may also use e.g. an OLED display. Each picture point reproduced in the matrix screen 21 is formed by a pixel group of several subpixels and extends over three lines, so that each desired color may be reproduced in a manner true to color, independently of the width of the picture point or the pixel group. In each case a detail of one of the lines of the matrix screen 21, which extends over eighteen of the subpixels 24, is shown in FIG. 3 in five different conditions which are indicated with the letters a to e, wherein in each case four such pixel groups M1, M2, M3 and M4 are shown there.

The beam splitter raster 22 may e.g. be designed as a slot raster or as a rod lens raster, wherein the slots or rod lenses of the beam splitter raster 22—assuming a suitable arrangement of the colored subpixels 24—may in some embodiments be inclined by about 20 degrees out of the vertical. With other embodiments, the beam splitter raster 22 may also be designed as a step raster, hole raster or spherical lens raster.

Finally, the screen includes a control unit 25 which, with regard to programming technology, is set up for activating the matrix screen 21 and may activate the subpixels 24 of the matrix screen 21 in dependence on picture information, in particular in dependence on picture information of different stereoscopic fields.

In an operating mode, the screen may be operated as a conventional multiperson screen, by way of picture information of twenty stereoscopic fields which are complementary to one another, being reproduced on the subpixels 24 of the matrix screen 21 in a cyclical sequence, so that in each case one of these stereoscopic half pictures is visible from each of the laterally offset observation zones 23. Then several persons may simultaneously perceive autostereoscopic pictures of the same screen, in a plane 26 which is distanced to the matrix screen 21 by a nominal observation distance 23 and in which the observation zones 23 have a maximal width (typically a width of about an average eye distance of 65 mm or somewhat less).

Here, a different method for representing picture information on the autostereoscopic screen is to be described. With this method, the subpixels 24 of the matrix screen 21 are activated with picture information of, in the present case, four different scenes, in a manner such that a first observer 27 of the screen may exclusively see a first scene, a second observer 28 of the screen exclusively a second scene, a third observer 29 exclusively a third scene and a fourth observer 30 exclusively a fourth scene. With regard to the scenes, it is thereby the case of possibly moved pictures, which may be completely different and in particular may not be complemented into a stereo-picture as stereoscopic half pictures which are complementary to one another. The control unit 25 may be configured to distribute the picture information of the four scenes, to which in the present case a picture is assigned in each case, onto the subpixels 24, such that in each case a coherent zone 31 in front of the screen is assigned to each of these pictures or scenes, from which zone this scene is exclusively visible. Thereby, in the present case, all four zones 31 are larger than the individual observation zones 23.

In some embodiments, the control unit 25 activates the subpixels 24 of the matrix screen 21 in a manner such that picture points of each of the, in the present case four, pictures are reproduced in each case by groups of adjacent subpixels 24, so that each of the pictures and each of the scenes are visible in exactly one of the zones 31, wherein in each case groups which are assigned to the different pictures, alternate in a cyclical sequence in each of the lines of the matrix screen 21. Thereby, the groups of adjacent subpixels 24 which are assigned to the different pictures and thus to the different scenes, connect to one another in a direct manner or may be separated from one another by way of one or, as the case may be, several blanked subpixels 24. With the pixel groups M1, M2, M3 and M4 shown in FIG. 3, it is the case of those groups of a width of, in the present case, three and five subpixels 24. Thereby, in each case however, only of detail of a single line of the matrix screen 21 is shown, whilst the subpixels groups M1 to M4 in each case extend over three consecutive lines.

One may recognize in FIG. 1 that the observers 28, 29 and 30 are placed such that their eyes have a distance to the screen or more accurately to a plane defined by the screen, which is smaller compared to a nominal observation distance d. In order, despite this, to ensure that the eyes of this observer 28, 29 and 30 are completely located in the respective zone 31, the picture information of the scenes assigned to these observers 28, 29 and 30 is written into the subpixels 24 of the matrix screen 21, in a manner spread in the lateral direction, such that the zones 31 from which these scenes are visible, in each case have a maximal width in an observation plane 32, which lies closer to the screen than the plane 26. Averaged over a complete line of the matrix screen 21, the picture points or pixel groups M2, M3 or M4 which form the pictures of these three scenes, therefore have an average distance (defined as the distance between surface centers of gravity or between brightness centers of gravity or between right or left edges of the pixel groups M2, M3 or M4), which is somewhat larger than a width of twenty consecutive subpixels 24. Inasmuch as the first observer 27 is located in front of the plane 26, the same may of course also apply to the pixel groups M1. The spread in the lateral direction may be easily recognized in FIG. 1 by way of the fact that e.g. the zone 31 of the third observer 29 is spanned by way of the picture points visible from this scene, or pixel groups M3, occupying the picture channels 9 to 12 on the left picture edge (at the top in FIG. 1), and in contrast occupying the picture channels 11 to 14 on the right picture edge (at the bottom in FIG. 1).

The screen of FIG. 1 also includes a device 33 for detecting a head position or eye position of the observer 27, 28, 29 and 30. This device 33 may, for example, be realized with two video cameras which are arranged laterally offset to one another, and a picture recognition program which is known per. An activation of the matrix screen 21 is set or changed by way of the control unit 25 in dependence on the head positions or eye positions of the observers 27 to 30 detected by the device 33, in a manner such that both eyes of each of the observers 27 to 30 in each case come to lie within the zone 31 and also remain in the zone 31 given a movement of the head, from which zone the scene assigned to the respective observer 27, 28, 29 and 30 is visible. For this, edges of the pixel groups M1 to M4 and thus also the pixel groups M1 to M4 themselves are displaced by way of previously blanked subpixels 24 or ones assigned to other picture groups (and other pictures), being added to these pixel groups M1, M2, M3 and M4, and subpixels 24 lying at other locations at edges of the pixel groups M1, M2, M3 and M4 being blanked or assigned to other picture points (and thus other pictures).

Figure 2:
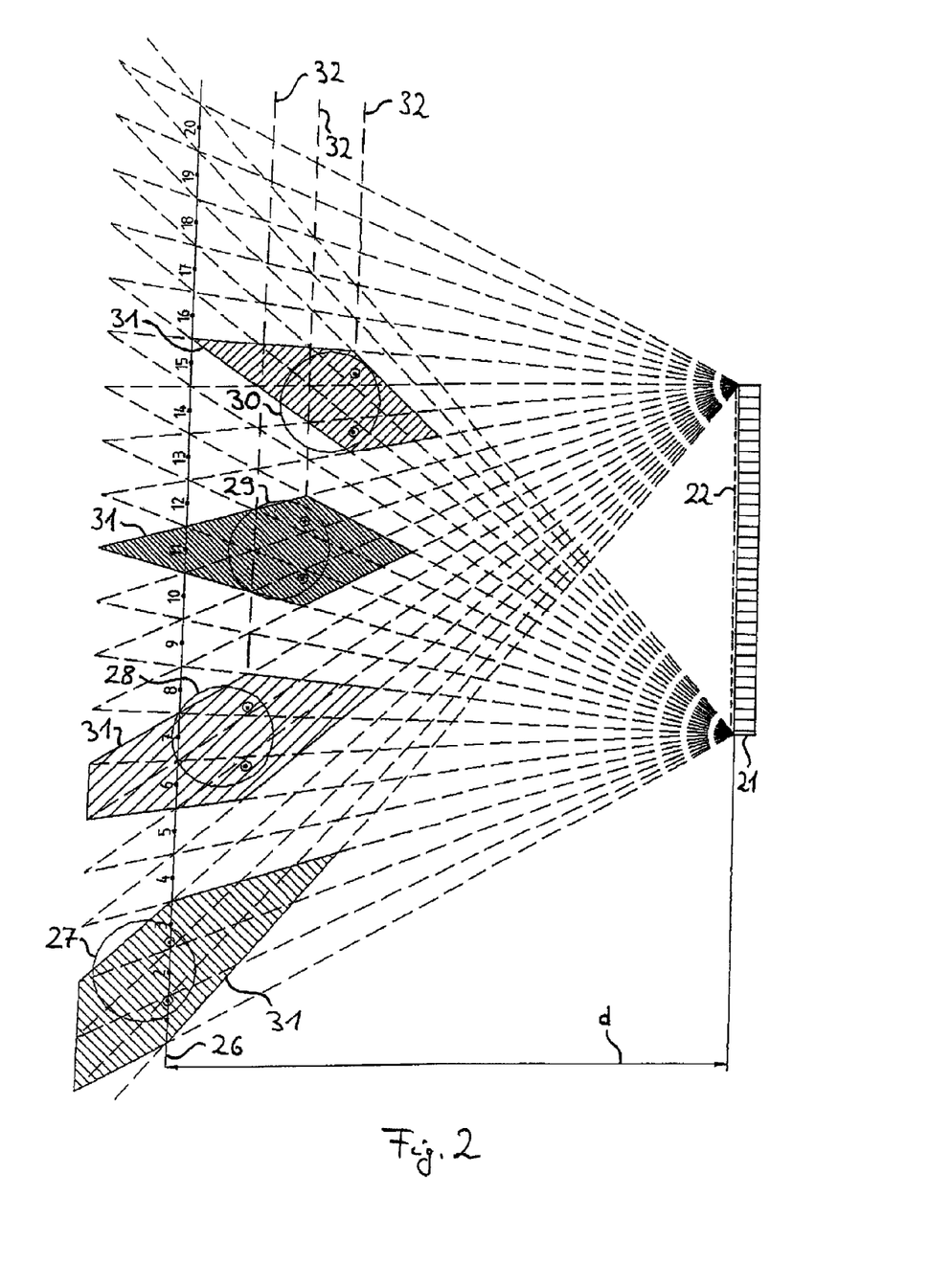
FIG. 2 is a schematic representation similar to FIG. 1, with the same screen being activated in a slightly different manner.

This is illustrated by way of example in the FIGS. 2 and 3. Thereby, FIG. 2, in which recurring features are again provided with the same reference numerals, in a representation according to FIG. 1, shows a situation after a movement of the observer 27 to 30 (the control unit 25 and the device 33 are only drawn exclusively in FIG. 1 for the purpose of a better overview). Thereby, the observers 27 to 30, compared to the situation of FIG. 1, from their point of view, have moved in each case a little to the right, wherein the fourth observer 30 has also changed his distance to the screen. In FIG. 1, one may also recognize how the four zones 31 have been tracked, in order to ensure that each of these zones 31, as was previously the case, covers both eyes of in each case one of the observers 27 to 30. By way of example, in FIG. 3, from the top to the bottom and for five consecutive points in time a to e, it is shown how the pixel groups M1 to M4 are displaced by way of a redistribution of picture information and intensities (thus brightness values) and also changed in their size, for tracking the zones 31. Thereby, in each case weighting functions for the picture points of the four different pictures are shown in each case in the form of a bar chart, the values of said pictures which are defined for each subpixel 24, being multiplied by a brightness value, which results from the picture information, for the respective picture point of the respective picture. As may be easily recognized there, the redistribution and displacement may be effected in a quasi stepless manner despite the finite extension of the subpixels 24. Lateral movements of the observers 27 to 30 as well as also changes of the distances between the observers 27 and 30 and the plane defined by the screen are compensated by way of the described displacement of the edges of the pixel groups M1 to M4 and thus of the picture points, wherein in the first case, the picture points are laterally displaced and in the second case, the above described spread in the lateral direction is adapted and the respective observation plane 32 is displaced by way of this.

Figure 4:
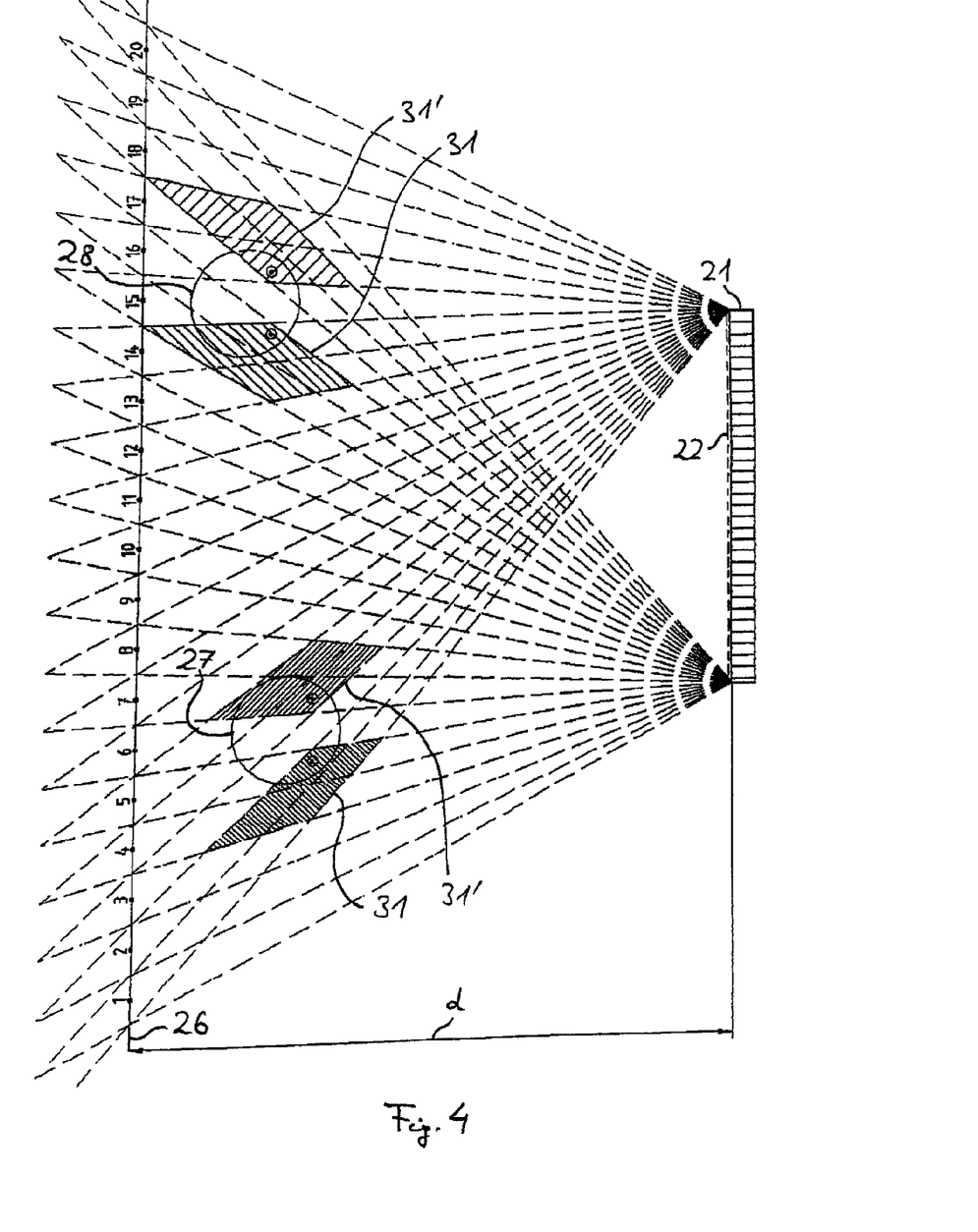
FIG. 4 is a schematic representation in which two observers may in each case see one stereo-picture.

Each of the observers 27 to 30 sees a mono-picture in the case as illustrated in FIGS. 1 and 2. The screen may however also be operated such that one or more persons may not only see a scene specific to the respective person, but may also perceive this as a stereo-picture. Thus FIG. 4b e.g. shows the case, in which only a first observer 27 and a second observer 28 view the screen, wherein the two eyes of each of these observers 27 and 28 lie in two adjacent zones 31 and 31', wherein a right stereoscopic field is to be seen from the respective right zone 31, and a left stereoscopic field in the respective left zone 31'. In this case too, the picture information of different scenes are written into the subpixels 24 of the matrix screen 21, such that the first observer 27 may only see a first scene and the second observer 28 only a second scene, which may be differentiated from this. Thereby, the picture information now however for each of these scenes in each case includes picture information of two stereoscopic semi-pictures which complement one another in each case into a stereo-picture of the first scene or the second scene and may be autostereoscopically perceived by the observers 27 and 28.

Figure 5:
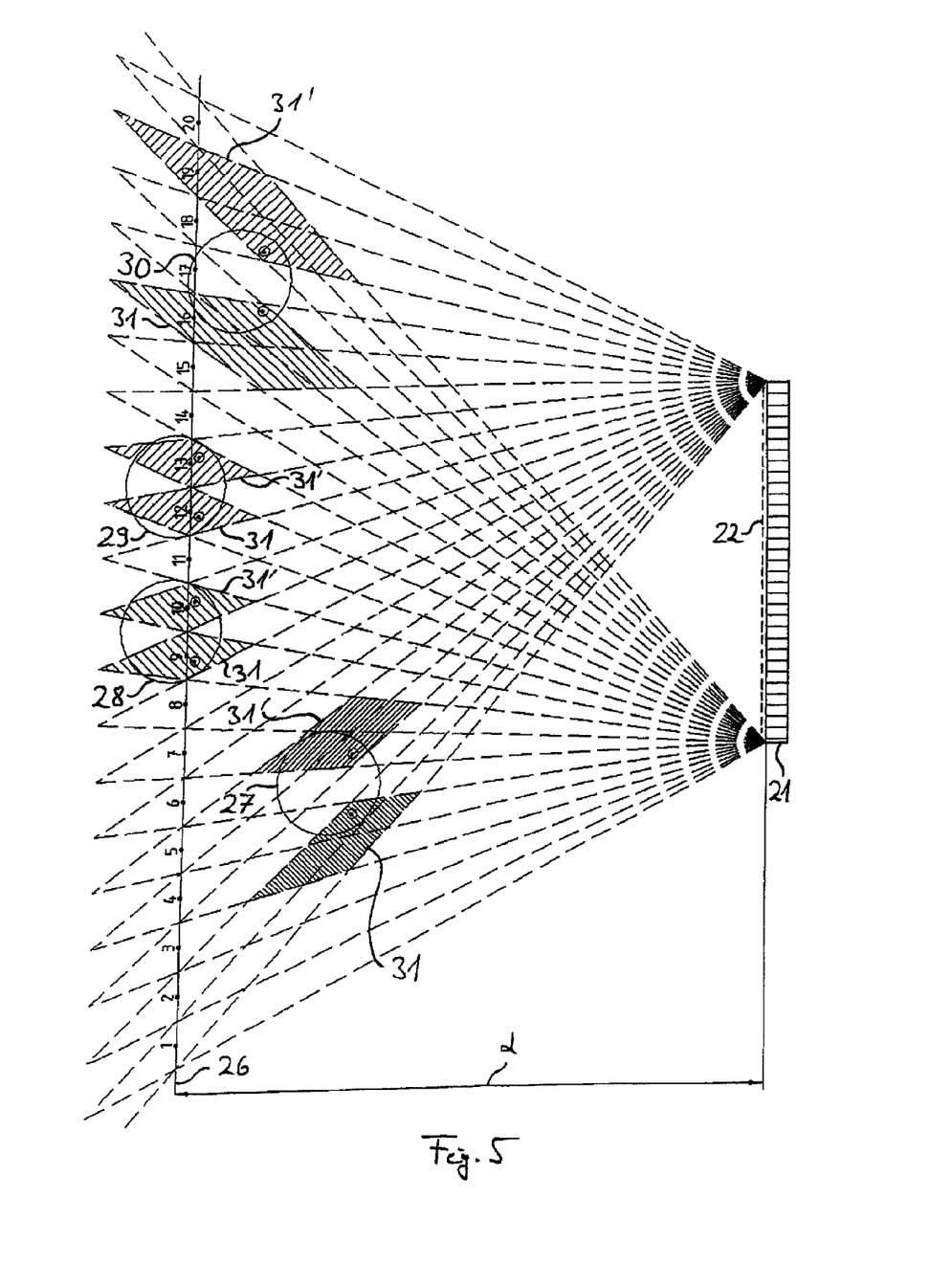
FIG. 5 is a schematic representation in which four observers may see in each case one stereo-picture.
Figure 6:
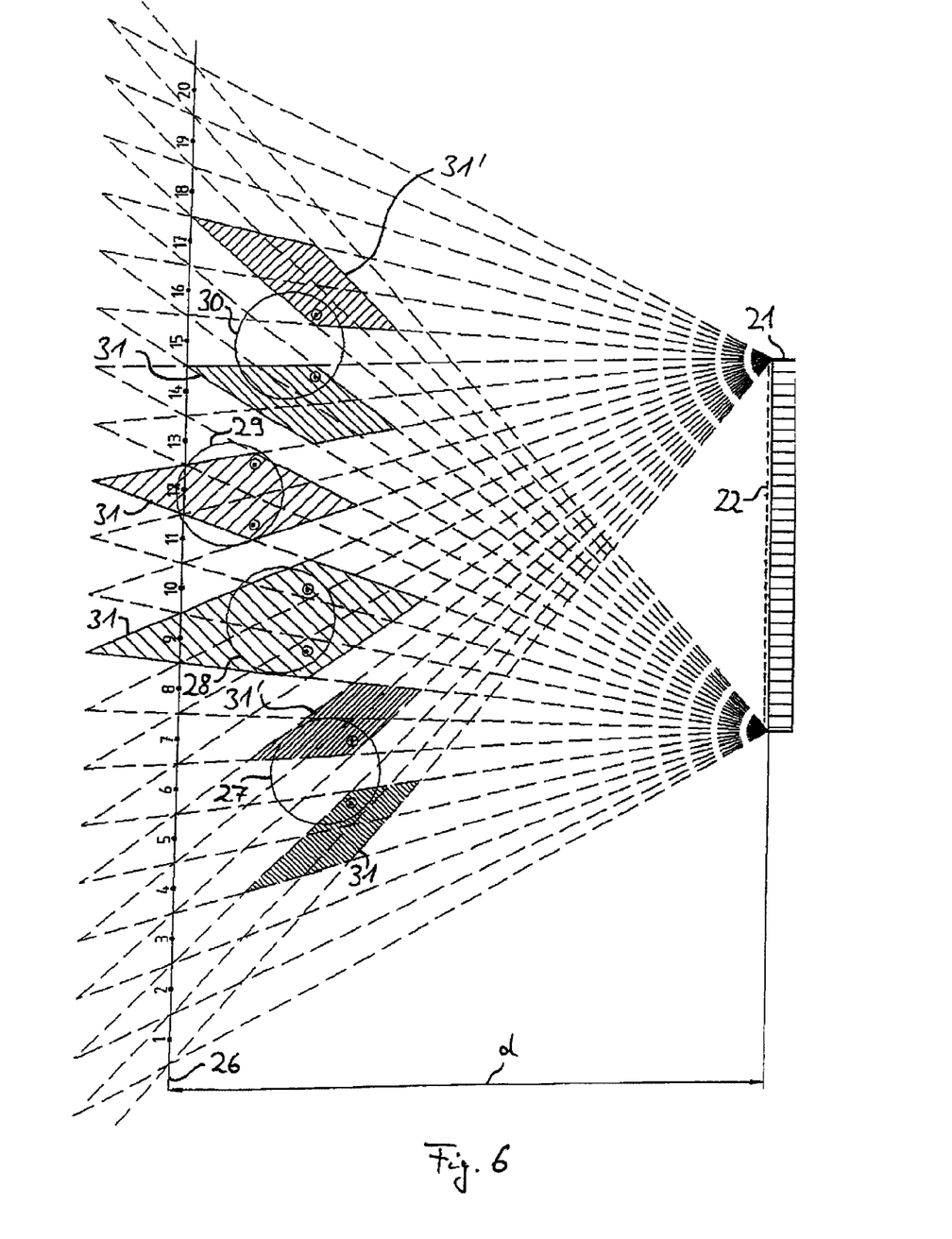
FIG. 6 is a schematic representation in which two of four observers may see in each case one stereo-picture.
Figure 7:
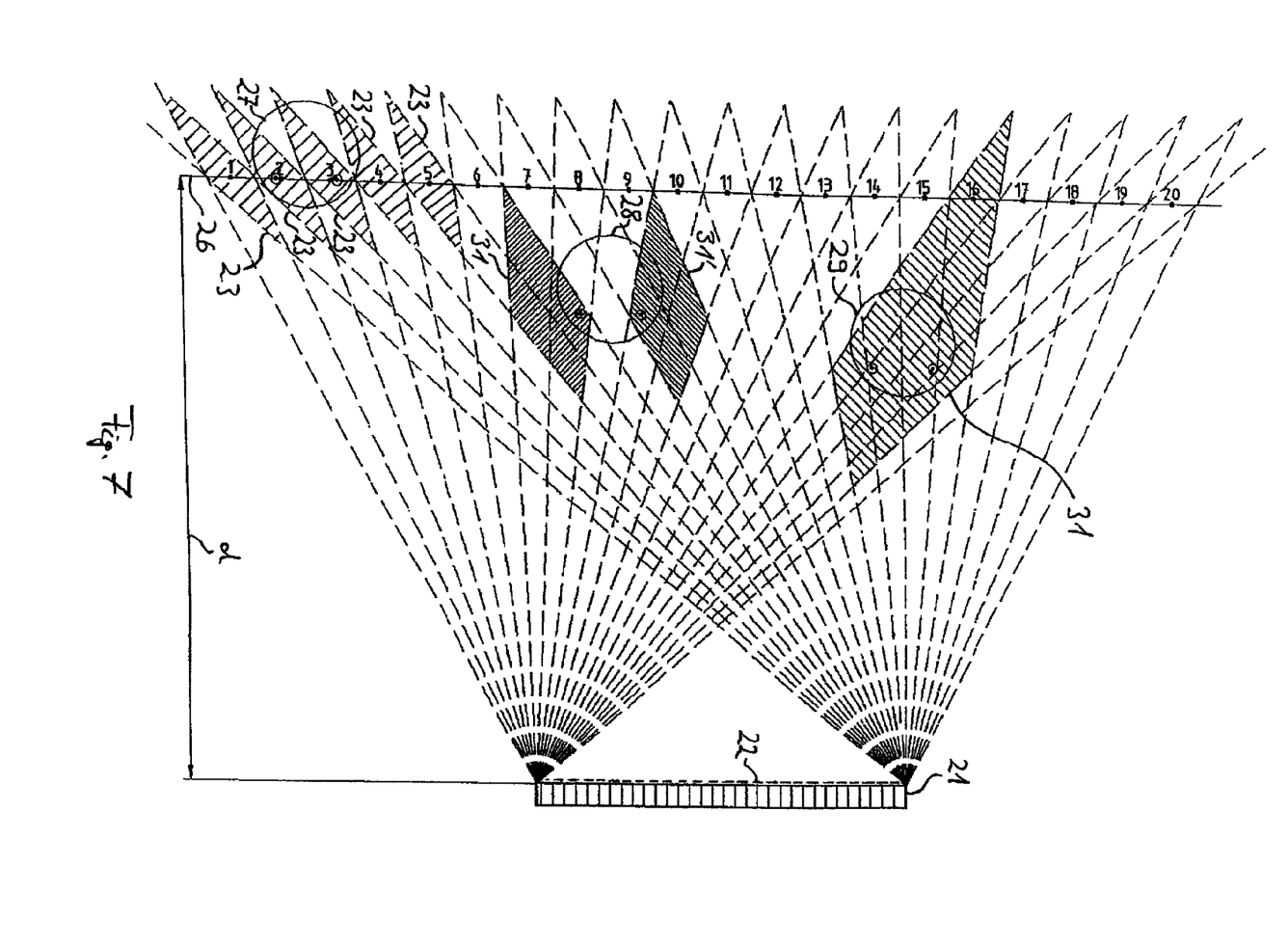
FIG. 7 is a schematic representation in which the screen is activated slightly differently.

Modified situations are represented in a corresponding representation in FIGS. 5 to 7, in which the matrix screen 21 is accordingly activated in a modified form, wherein each of in each case three to four observers 27, 28, 29 and 30 of the screen may in each case see an individual scene.

Thereby, that which has been said of the observers 27 and 28 with regard to FIG. 4, applies to four observers 27 to 30 in the situation of FIG. 5. Each of these observers 27 to 30 in each case sees a stereo-picture of a scene which is specific to the respective observer 27, 28, 29 and 30. Thereby, only the two observers 27 and 30 are present somewhat in front of the plane 26, while the observers 28 and 29 are located with their eyes in the plane 26. The zones 31 and 31' which are assigned to the eyes of these two observers 28 and 29, therefore in this case are formed in each case by exactly one of the observation zones 23, and specifically for the second observer 28 by the picture channels 9 and 10, and for the third observer 29 by the picture channels 12 and 13.

A situation is represented in FIG. 6, in which in each case two adjacent zones 31 and 31', are assigned only to the two observers 27 and 30, in which zones in each case one of two complementary fields are visible, so that these observers 27 and 30 may in each case see a stereo-picture, corresponding to the observers 27 and 28 from FIG. 4. The eyes of the two observers 28 and 28 in contrast are located as in the situation of FIGS. 1 and 2, in each case in a larger zone 31, in which scenes specific to each of these observers 28 and 29 may be seen as mono-pictures.

A further possible situation is represented in FIG. 7, which shows a first observer 27, a second observer 28 and a third observer 29 of the same screen in another operating mode. Here, as described with regard to FIG. 4, two zones 31 and 31' are provided for the second observer 28, in which two fields of a scene specific to the observer 28 are visible, so that he may see a stereo-picture. These zones 31 and 31' as with the zones 31 and 31' from the preceding figures and according to the description with regard to the FIGS. 1 to 3, are tracked with a movement of the observer 28, such that the right eye of the observer 28 always remains in the zone 31, and the left eye always remains in the zone 31'. The third observer 29, whose head is located in a larger zone 31 which is likewise tracked given a movement of the head, sees a mono-picture of a scene specific to the observer 29. In contrast, a region is assigned to the first observer 27, and is spanned by five adjacent observation zones 23—corresponding to the picture channels 1 to 5—in which, as with a normal operation for screens of the shown type, five different stereoscopic fields are visible, wherein each of these fields may be seen from exactly one of these five observation zones 23, and wherein fields visible in adjacent observation zones 23 are in each case are complementary to one another such that together they result in a stereo-picture. This stereo-picture in the present case shows a scene which is specific to the first observer, said scene, when the observer moves to the right or left, being able to be seen by him from slightly different directions. Thereby, the activation of the matrix screen 21, given a movement of the first observer 27, only changes if this observer 27 were to leave the mentioned region on the other hand to the left. If the mentioned region, which under certain circumstances may also have a larger number of observation zones 23, is adequately large, then also several persons—as on a multi-view display or multi-user display, operated in the usual manner—may perceive the same scene autostereoscopically, whilst other scenes are simultaneously shown to the observers 28 and 29.

As long as one may at least also show stereo-pictures, as shown in FIGS. 4 to 6, the control unit 25 with regard to programming technology may be set up to activate the subpixels 24 of the matrix screen 21 within the pixel groups, which in each case reproduce a picture point of one of the fields, with an intensity which is weighted in such a manner (thus of a brightness weighted in such a manner) that intensity maxima may be achieved at locations within the two zones 31 and 31', from which the two complementary fields are visible, said locations being distanced to one another by the eye distance of the respective observer 27, 28, 29 or 30.

As an arrow drawn in FIG. 1 illustrates, the control unit 25, with regard to programming technology, may be set up to receive picture data and/or description data 34 of at least one of the scenes, and from this to produce first picture data of one or more of the pictures to be reproduced, in order to assign the thus produced picture data of different contents to the different zones 31 or 31'. The picture data and/or description data 34 under certain circumstances may thereby also enter in coded form and then be decoded in the control unit 25.

The assignment of the picture information of the different scenes to the zones 31 or 31' may under certain circumstances be effected in dependence on input variables 35, which may be inputted by a user. The user—thus each of the observers 27 to 30—may then infinitely select from the scenes which are available.

If the picture data is computed from the description data 34, the control unit 25 may also be configured to change at least one virtual camera position or at least one stereo-base, with respect to which the picture data are produced, in dependence on at least one command variable. Thereby, a distance of the observer 27, 28, 29 or 30 to the screen or a lateral head position may be considered as command variables, which may be determined in each case with the device 33. Alternatively or additionally, also other input variables 35 may serve as command variables which for this may be inputted by the user, e.g. into a remote control or into an input apparatus for interactive games.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A method for representing picture information on an autostereoscopic screen that is designed as a multi-person screen and that is suitable for the simultaneous display of a plurality of more than two views which are visible in each case from at least one of different observation zones laterally displaced to one another, the screen including a matrix screen having a multitude of pixels and a beam splitter raster that is suitable for guiding light coming from the pixels into at least one of the observation zones, the method comprising:
    activating the pixels of the matrix screen with picture information of a number of pictures of at least two different scenes, said number being lower compared to the mentioned plurality, a first of the at least two different scenes being assigned to a first observer of the screen and a second of the at least two different scenes being assigned to a second observer of the screen, the pixels being activated in a manner such that each of the at least two different scenes is visible from at least one coherent zone in front of the screen from which zone other scenes are not visible;
    detecting head positions or eye positions of the first observer and the second observer; and
    setting or changing activation of the pixels of the matrix screen in dependence on the detected head positions or eye positions in a manner such that two eyes of each of the first observer and the second observer come to lie or remain within the at least one zone from which the scene assigned to the first or second observer is visible, such that the first observer of the screen may exclusively see the first of the at least two scenes, and the second observer of the screen may simultaneously exclusively see the second of the at least two scenes.

2. A method according to claim 1, wherein picture points of each of the scenes are reproduced via groups of adjacent pixels of the matrix screen, wherein groups that are assigned to the different scenes, alternate in a cyclical sequence, in each of a multitude of lines of the matrix screen.

3. A method according to claim 1, wherein at least one of the coherent zones, from which in each case one of the scenes is visible, is larger than the individual observation zones.

4. A method according to claim 1, wherein the picture information of at least one of the scenes is written into the pixels of the matrix screen in a laterally spread manner, in a manner such that the coherent zone from which this scene is visible, has a maximal width in an observation plane, which lies closer on the screen than a plane in which the observation zones have a maximal width.

5. A method according to claim 1, wherein the picture information of at least one of the scenes includes picture information of two different stereoscopic fields that complement one another into a stereo-picture, wherein the matrix screen is activated such that each of these fields is visible in one of two of the coherent zones, so that one of the observers may perceive this stereo-picture in an autostereoscopic manner.

6. A method according to claim 5, wherein the pixels of the matrix screen, within pixel groups, which reproduce a picture point of one of the fields, are activated with such an intensity weighted in such a manner, that within the two zones, from which the two complementary fields are visible, intensity maxima are achieved at locations which are distanced to one another by an eye distance of the respective observer.

7. A method according to claim 1, wherein pixel groups or edges of pixel groups, which in each case reproduce one of the picture points of one of the at least two scenes, are displaced by way of previously blanked pixels or ones assigned to other picture points, being added to these pixel groups and/or outerlying pixels of these pixel groups being blanked or assigned to other picture points.

8. A screen configured to simultaneously display a plurality of more than two views which are in each case visible from at least one of several laterally displaced observation zones, the screen comprising:
    a matrix screen with a multitude of pixels;
    a beam splitter raster that is suitable for guiding light coming from the pixels, in each case into at least one of the observation zones;
    a device for simultaneously detecting head positions or eye positions of at least two observers; and
    a control unit for activating the pixels of the matrix screen in dependence on picture information;
    wherein the control unit is configured to activate the pixels of the matrix screen in dependence on the detected head positions or eye positions of the at least two observers by distributing the picture information of a number of pictures of at least two different scenes, said number being lower compared to the mentioned plurality and each of the at least two different scenes being assigned to one of the at least two observers, onto the pixels, in a manner such that at least one coherent zone in front of the screen is assigned to each of these scenes, from which zone exclusively this scene is visible and of which at least one is larger than the individual observation zones, and such that two eyes of each of the observers come to lie or remain within the at least one zone, from which the scene assigned to this observer is visible.

9. A screen according to claim 8, wherein the control unit is set up to activate the pixels of the matrix screen in a manner such that picture points of each of the pictures are reproduced in each case by groups of adjacent pixels of the matrix screen, wherein in each case groups which are assigned to the different pictures, alternate in a cyclic sequence, in each of a multitude of lines of the matrix screen.

10. A screen according to claim 8, wherein the control unit is set up to write the picture information of at least one of the pictures into the pixels of the matrix screen in a manner which is spread in a lateral direction, such that the coherent zone from which this scene is visible has a maximal width in an observation plane that lies closer to the screen than a plane in which the observation zones have a maximal width.

11. A screen according to claim 8, wherein at least two stereoscopic fields which complement one another into a stereo-picture of one of the scenes, are amongst the pictures, wherein the control unit is set up to activate the matrix screen such that these fields are visible in two of the mentioned zones that are adjacent to one another.

12. A screen according to claim 11, wherein the control unit is configured to activate the pixels of the matrix screen within pixel groups which in each case reproduce a picture point of one of the fields, with an intensity weighted in such a manner, that within the two zones, from which the two complementary fields are visible, intensity maxima are achieved at locations which are distanced to one another by an eye distance of a respective observer.

13. A screen according to claim 8, wherein the control unit is configured to receive picture data and/or description data of at least one of the scenes, and from this to produce picture data of one or more of the pictures.

14. A screen according to claim 13, wherein the control unit is configured to assign the thus produced picture data of different content to the different zones.

15. A screen according to claim 13, wherein the control unit is configured to change at least one virtual camera position or at least one stereo-base, with regard to which the picture data are produced, in dependence on at least one command variable.

* * * * *